UNITED STATES PATENT OFFICE.

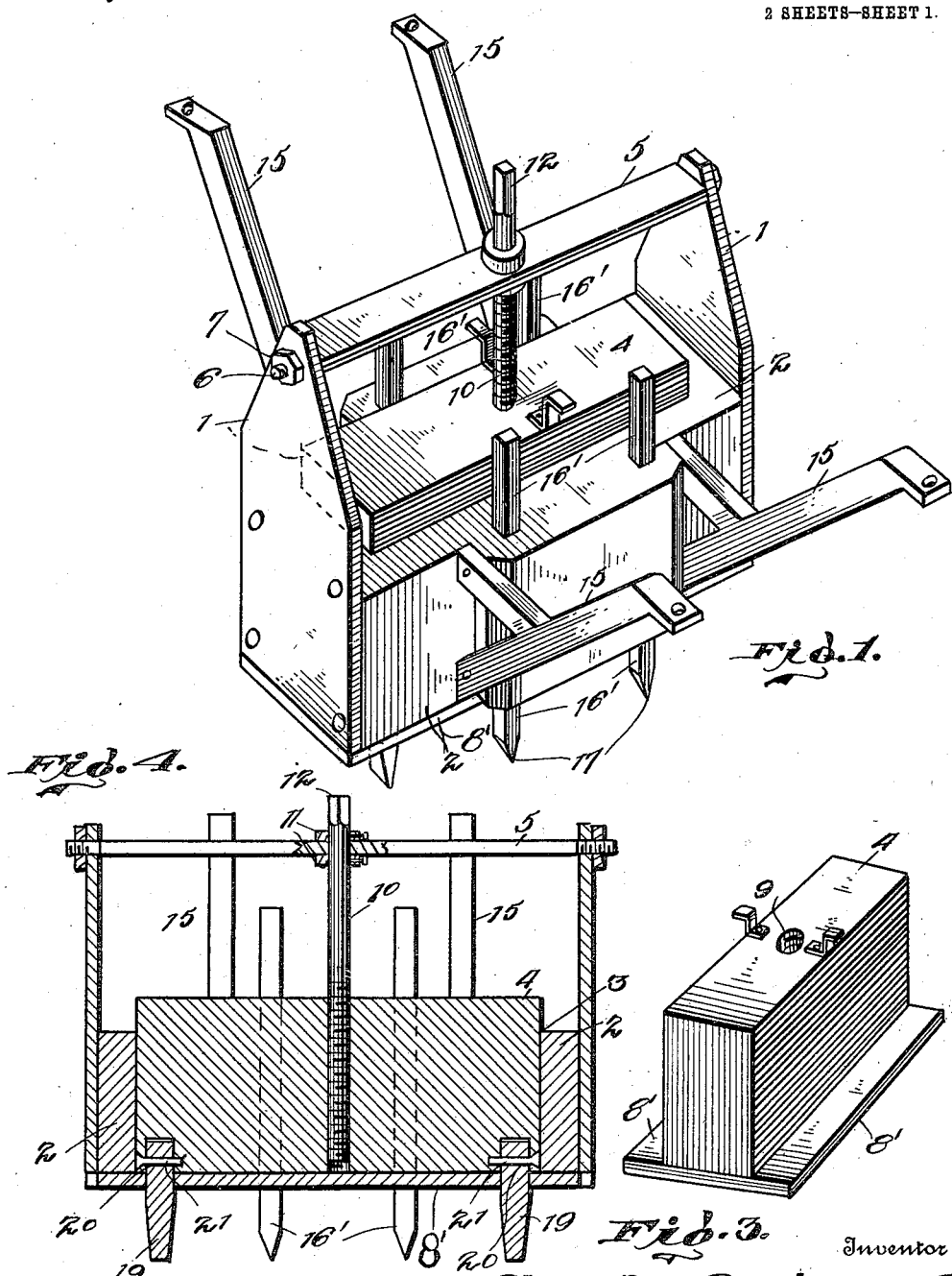

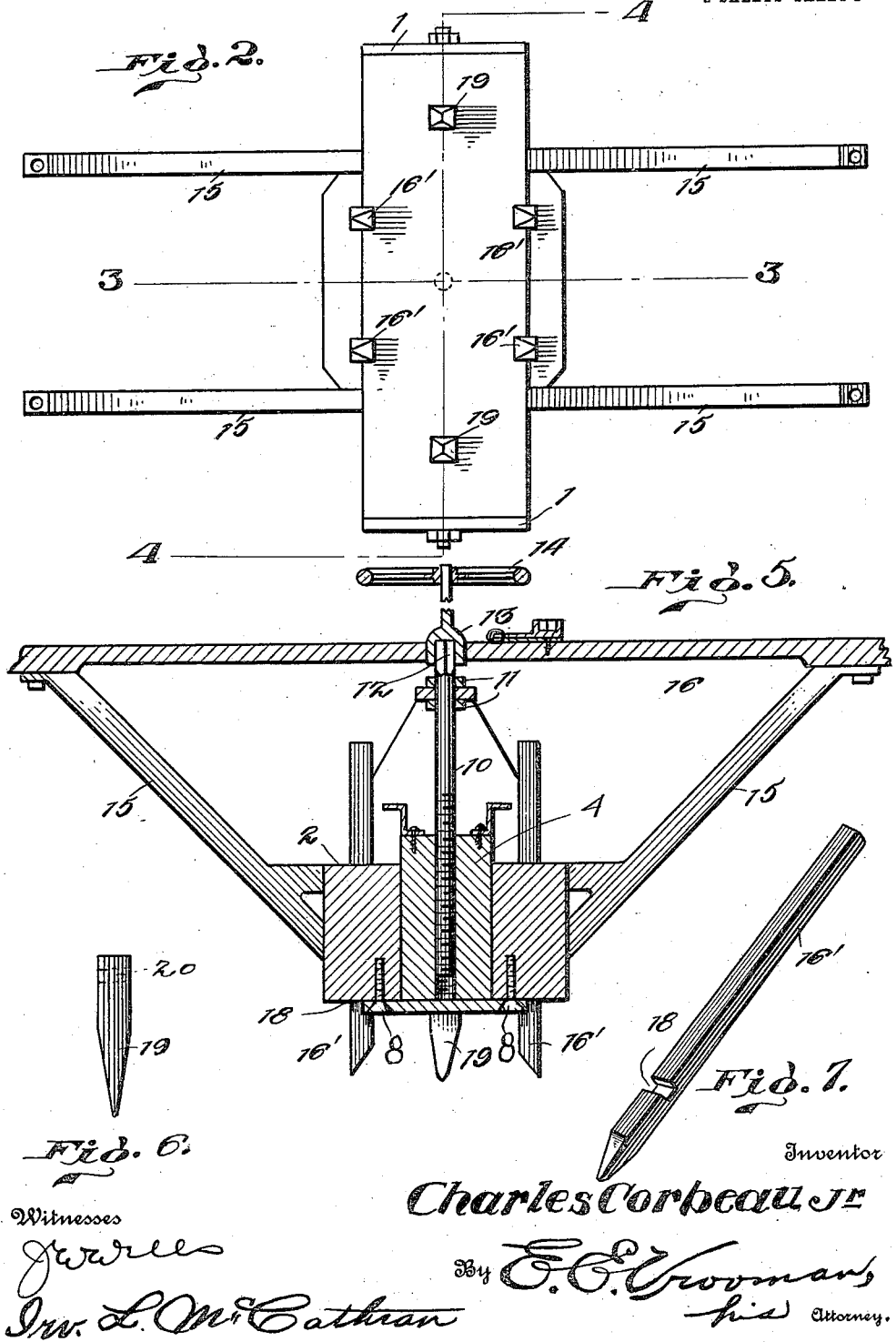

CHARLES CORBEAU, JR., OF SOUTH BETHLEHEM, PENNSYLVANIA.

SAFETY SLIDE-BRAKE.

990,473.

Specification of Letters Patent.  Patented Apr. 25, 1911.

Application filed June 4, 1910. Serial No. 565,000.

*To all whom it may concern:*

Be it known that I, CHARLES CORBEAU, Jr., a citizen of the United States, residing at South Bethlehem, in the county of Northampton and State of Pennsylvania, have invented certain new and useful Improvements in Safety Slide-Brakes, of which the following is a specification, reference being had therein to the accompanying drawing.

This invention relates to brakes for vehicles and has especial reference to that class of brakes which are operated by raising and lowering them from the vehicle, said brakes being provided with teeth, or other suitable engaging devices which are lowered to engage the ground or road-bed over which the vehicle passes.

This invention has for its object to provide an improved brake of this kind which may readily be operated, and will effectually accomplish the purpose for which it is intended.

Referring to the accompanying drawing:—Figure 1 is a view in perspective of a brake constructed according to this invention. Fig. 2 is a plan view thereof looking at its under side. Fig. 3 is an enlarged detail view in perspective of a plunger used with this brake. Fig. 4 is a view of the brake in longitudinal section on the line 3—3 of Fig. 2. Fig. 5 is an enlarged detail view of the brake in cross section on the line 4—4 of Fig. 2, showing the brake attached to the bottom of a car. Fig. 6 is a detail view of one of the brake teeth detached. Fig. 7 is a view in perspective of another form of brake tooth detached.

The brake consists of a suitable supporting frame composed of vertical end plates 1, each secured at its lower portion to each end of body 2, formed with a rectangular oblong opening 3, extending from top to bottom of the body 2, and located in said opening 3, and vertically slidable therein is an oblong rectangular block 4 serving as a plunger.

The upper ends of the plates 1, are connected together in any suitable manner, as for example by cross bar 5 having a threaded projection 6 at each end, on which is mounted a nut 7 by means of which bar 5 is screwed to and firmly clamped between the end plates 1.

The body 4 has secured to its bottom by means of screws, a plate 8' which affords a longitudinal flange 8'' on each side of said block, or the plate may be formed integral with the block for a purpose hereinafter set forth. The body 4 is formed with a vertical threaded hole 9 extending from top to bottom thereof, and in threaded engagement with said hole or socket is a threaded rod 10 having its upper end projecting up through the bar 5 and through a pair of washers 11, and located on each side of said bar 5. The upper end of said rod 10, has a squared end 12 adapted to be engaged by a key 13, having a wheel handle 14 whereby the rod 10 may be turned in the hole 9, the rod being held against vertical movement by the collars 11. The plunger 4 will be thereby lowered and raised in the passageway 3. The brake is suspended from the bottom of the car by suitable brackets, as for example, the pairs of brackets 15, secured to the side of body 2 and secured at their upper ends to the bottom of the car 16, as shown in Fig. 5.

In order to have the brake engage with the ground or road-bed over which the vehicle passes it is provided with teeth, suitably arranged thereon and connected, some of which are slidably mounted on the base and others secured to the bottom of the plunger, as here shown.

The brake is provided with sets of rods 16' which are vertically movable in the passageway in the block 2, and are held in fixed position, and each provided with a tooth 17 at its lower end, and of suitable shape to engage the ground.

The rods 16' are held in fixed position in the base 2 by any suitable means, and as here shown by means of a notch 18 on the side of the rod 16' adjacent to its lower end. Said notch 18 engages the edge of the flange 8 thereby engaging the rods 16' with the plunger. Other teeth 19 are provided which are shown in Fig. 4, as short teeth, a suitable number of such teeth being provided and being secured to the bottom of the plunger by being inserted in the sockets 20 in the plunger and held in place by screws 21.

It will be seen that when it is desired to operate the brake, the plunger is lowered to engage the teeth at the front end of the brake, in the line of travel of the vehicle, with the ground or road-bed; and the brake is released by raising the plunger and moving said teeth out of engagement with the ground. By having the teeth arranged as shown, at each end and midway between the ends of the plunger, the teeth will engage with the ground in either direction of travel of the vehicle.

The teeth constructed and arranged as set forth may readily be removed and replaced when worn or broken.

The invention is not limited to the specific construction and arrangement of parts as herein set forth, since they may differ from those set forth without departing from essential features of the invention.

Having described the invention, I claim:—

1. A vehicle brake of the character described, comprising a frame having a solid base portion with a vertical passageway, said frame being adapted to be suspended from a vehicle, a solid block vertically movable in said passageway and having laterally extending flanges at its bottom normally bearing against the under side of said frame, fixed teeth projecting from the bottom of said plunger at each end thereof, sets of detachable teeth located at the sides of said plunger and consisting of rods, each having a notch adapted to detachably engage a flange of said plunger, said teeth depending below the bottom of said plunger, and a mechanism for vertically operating said plunger.

2. A vehicle brake of the character described, comprising a frame, consisting of a solid body with an elongated vertical passageway extending through the same, and vertical end plates secured to and projecting above said solid body, a detachable transverse bar connected to the upper ends of said end plates, a plunger consisting of an oblong block having a lateral flange at its bottom on each side thereof, said plunger being slidable in said passageway and having a vertical threaded hole, short detachably secured teeth depending from the bottom of said plunger at its ends, sets of teeth depending from the side of said plunger and consisting of notched rods detachably engaged with the flanges of the plunger and vertically movable through the base of the main frame, a threaded rod engaging the threaded hole in said plunger, and projecting through said transverse bar, an operating handle mounted on the upper end of said bar and supporting brackets projecting from the sides of said case portion of the main frame and adapted to be secured to the bottom of the vehicle.

3. A vehicle brake of the character described comprising a frame, a solid base portion therefor, a passage way in said base portion, a plunger vertically movable in said passageway, flanges extending from said plunger and bearing normally against the bottom of said frame, fixed teeth projecting from said plunger, detachable teeth at the side of said plunger, means on each detachable tooth for engaging said flanges, and a mechanism for vertically operating said plunger.

4. A vehicle brake of the character described comprising a frame having vertical end plates and a solid base portion, a transverse bar connecting the upper ends of said plates, a passageway in said base portion, a plunger vertically movable in said passageway, means carried by said plunger to limit the movement thereof, teeth also carried by said plunger, a mechanism for operating said plunger, and means for securing said frame to a vehicle body.

In testimony whereof I hereunto affix my signature in presence of two witnesses.

CHARLES CORBEAU, Jr.

Witnesses:
JAMES CONNORS,
JOE. DALEY.

---

Copies of this patent may be obtained for five cents each, by addressing the "Commissioner of Patents, Washington, D. C."